Sept. 6, 1955 R. F. SMITH 2,717,091
POWER SHOVEL AND IMPLEMENT ATTACHMENT
Filed March 30, 1953 3 Sheets-Sheet 1

INVENTOR.
Roy F. Smith.
BY Victor J. Evans & Co.
ATTORNEYS

Sept. 6, 1955  R. F. SMITH  2,717,091
POWER SHOVEL AND IMPLEMENT ATTACHMENT
Filed March 30, 1953  3 Sheets-Sheet 2
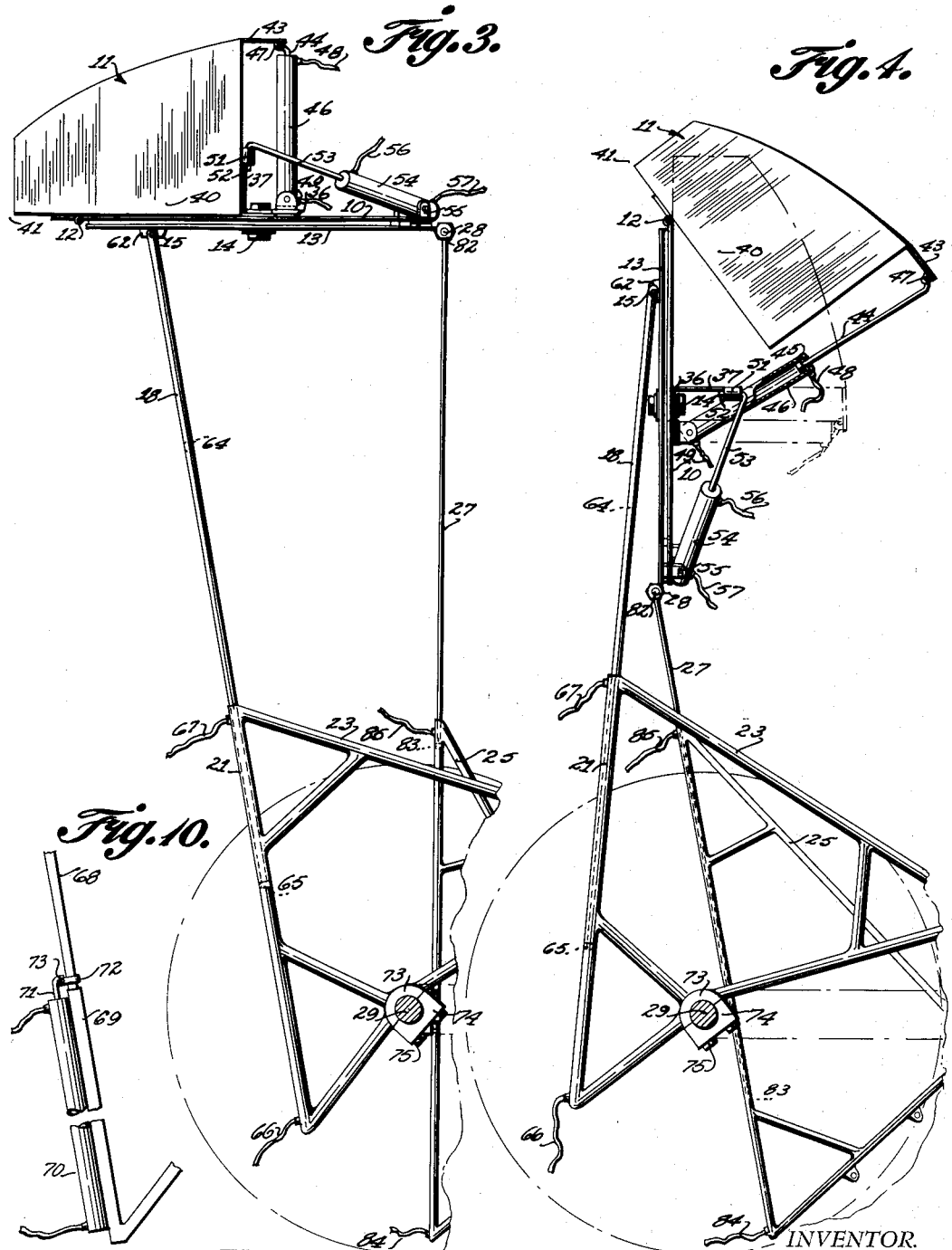
INVENTOR.
Roy F. Smith.
BY Victor J. Evans & Co.
ATTORNEYS Sept. 6, 1955  R. F. SMITH  2,717,091
POWER SHOVEL AND IMPLEMENT ATTACHMENT
Filed March 30, 1953  3 Sheets-Sheet 3
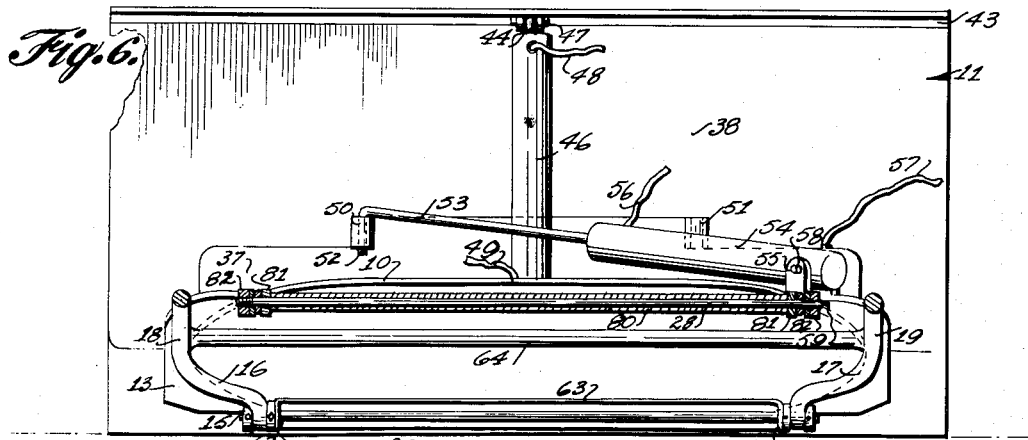
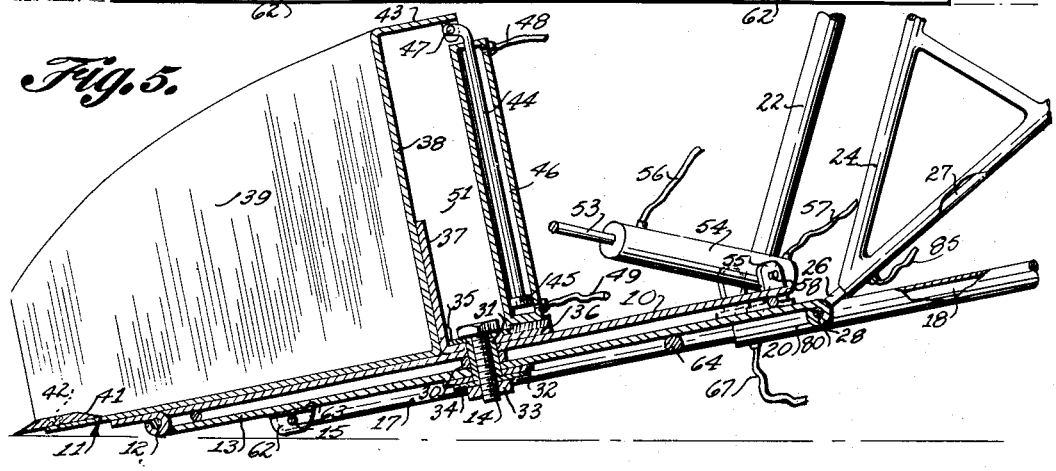
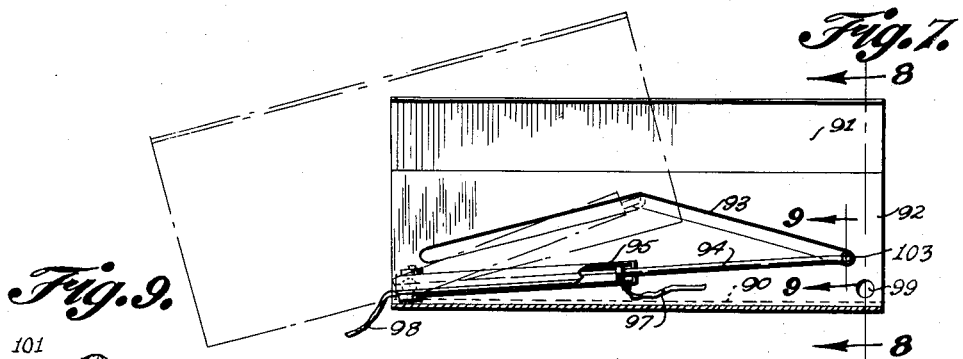
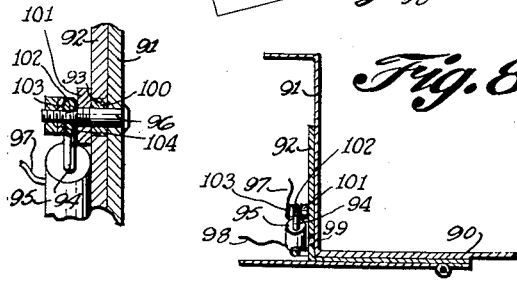
INVENTOR.
Roy F. Smith.
BY Victor J. Evans & Co.
ATTORNEYS United States Patent Office 2,717,091
Patented Sept. 6, 1955

2,717,091

POWER SHOVEL AND IMPLEMENT ATTACHMENT

Roy F. Smith, Silt, Colo.

Application March 30, 1953, Serial No. 345,545

1 Claim. (Cl. 214—132)

This invention relates to power attachments used in combination with tractors, trucks and other vehicles, and in particular a shovel or other implement carrying platform supported by pairs of frames pivotally mounted on a mounting beam and actuated by hydraulic or other fluid cylinders or jacks whereby an implement, such as a scoop, and particularly mounted on a rear axle of a tractor, may be moved into soil, or the like, elevated, rotated on the platform, and dumped whereby soil and the like may be transported from one position to another and may be dumped from the rear, sides or front of the attachment.

The purpose of this invention is to provide means for actuating a scoop or other implement by the power take-off, or pressure actuating means of a tractor or other vehicle whereby an implement, such as a scoop may pick up, elevate, and dump products with a comparatively simple operation.

Various types of attachments have been provided for tractors and other equipment for handling materials and particularly for excavating leveling and filling and such devices have also been used in handling farm products and other materials in storage bins and manufacturing plants.

It has been found difficult, however, to provide a device in which an implement, such as a bucket or shovel, may pick up material, elevate the material and then turn to one side or to the rear so that the material may be discharged at substantially any point desired.

With this thought in mind this invention contemplates a material handling attachment for handling materials in bulk or packaged wherein a bucket, scoop, or similar implement may be moved straight into the work and elevated and after being elevated with material therein the device may be rotated about the center or pivot point on a platform whereby the device may be actuated to deposit the material from substantially any point around the said center.

The object of this invention is, therefore, to provide means for mounting and operating a platform on which a scoop or the like may be positioned wherein the platform may be raised and lowered, worked back and forth, elevated with the platform retained in a horizontal position and dumped from a point in a circle extended from the center of the platform.

Another object of the invention is to provide a support for a platform whereby a platform may be progressively elevated at the side of a building or the like to facilitate painting or otherwise working on the building.

Another important object of the invention is to provide means for mounting a platform whereby, with the platform retained in a horizontal position, it may be elevated, rotated and supported at elevated positions.

A further object of the invention is to provide a mounting attachment for power actuated scoops and other implements wherein mounting elements thereof are adapted to be moved outwardly from a supporting beam, such as the axle of a tractor, truck or the like, and elevated from the extended position to a dumping position with the device rotated about a center in the dumping position thereby making it possible to discharge materials from substantially any point in a circle described from the center of said platform.

A little further object of the invention is to provide an improved power shovel and implement attachment for actuating a scoop or the like to pick up materials, elevate the materials and dump the materials from different points on the platform in which the attachment is of a comparatively simple and economical construction.

With these and other objects and advantages in view the invention embodies a platform having a scoop thereon pivotally mounted on telescoping ends of horizontal beams of a pair of A frames with the inner edge of the platform hinged to the forward ends of horizontal beams of triangular shaped frames and with the parts actuated by fluid pressure control jacks or cylinders from a tractor or other vehicle upon which the device is mounted.

Other features and advantages of the invention will appear from the following description taken in connection with the drawings, wherein:

Figure 3 is a side elevational view similar to that shown in Figure 1 illustrating the position of the platform with a scoop thereon with the horizontal beams of the frames extended and with the platform in an elevated horizontally disposed position.

Figure 4 is a view similar to that shown in Figure 3 showing the extension beams of the triangular shaped frames retracted whereby the platform is turned from a horizontally disposed position to a vertical position, parts of the frames being broken away.

Figure 5 is a longitudinal section through the platform taken on line 5—5 of Figure 2 showing the relative positions of the parts and with the parts shown on an enlarged scale.

Figure 6 is a cross section through the upper part of the mounting showing a rear elevational view of the scoop and illustrating the pivotal connections of the A frames and triangular shaped frames to the platform.

Figure 7 is a detail illustrating a modification wherein a scoop is actuated to a forwardly and downwardly extended position with hydraulic jacks mounted on the sides thereon and connected to the sides of the scoop with bushings extended through V-shaped slots in side plates of a supporting frame.

Figure 8 is a cross section taken on line 8—8 of Figure 7 showing the mounting of the scoop in the frame.

Figure 9 is a detail similar to that shown in Figure 8 illustrating the pivotal connection of the connecting rod of the hydraulic jack or cylinder to the wall of the scoop through the slot in the side wall of the supporting frame.

Figure 10 is a detail illustrating a further modification wherein fluid pressure cylinders are positioned on the sides of the A frames and horizontally disposed sections of the triangular shaped frames.

Figure 1:
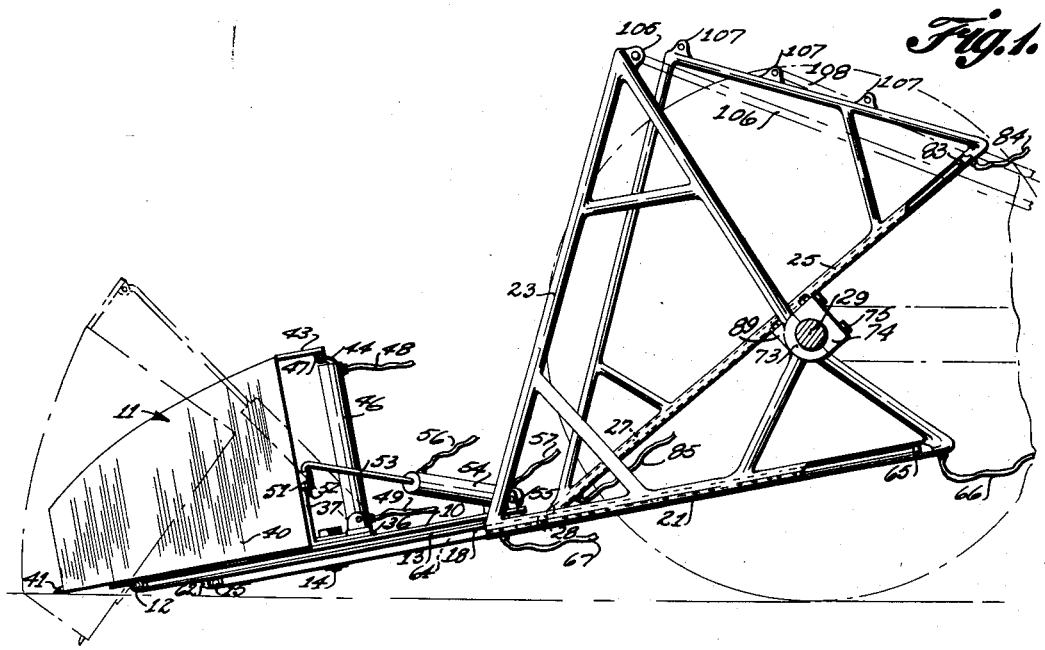
Figure 1 is a side elevational view of the attachment showing the parts mounted on a rear axle of a tractor, the wheel on the near side of the tractor being omitted and the axle broken away and shown in section and parts of horizontal beams of the operating frames being broken away to show cylinder elements therein.

Referring now to the drawings wherein like reference characters denote corresponding parts the improved scoop and other implement mounting attachment of this invention includes a turn-table or disc 10 which, in the design shown, is provided with a scoop 11 that is pivotally connected to the disc with a hinge 12, a platform 13 on which the disc is journaled with a stud 14 and which is pivotally connected with a rod 15 to inwardly extended arms 16 and 17 of horizontally disposed beams having outer telescoping sections 18 and 19 and tubular inner sections 20 and 21 which form base elements of A frames 22 and 23, respectively, and triangular shaped frames 24 and 25, telescoping sections 26 and 27, the ends of which are pivotally connected by a rod 28 to the inner edge of the platform 13, the triangular shaped frames and also the A frames being pivotally mounted on a beam or rear axle, as indicated by the numeral 29 and the frames and also sections thereof, and the scoop and disc being actuated by suitable fluid pressure cylinders.

In the design shown the disc 10 is provided with a hub 30 by means of which the disc is journaled on a bushing 31 having a flange 32 on the lower end, and the stud 14 is threaded through the bushing, as shown in detail in Figure 5. The lower end of the stud is provided with a nut 33 and a washer 34. The head of the stud 14 is positioned on a plate 35 and the plate is positioned on a flange 36 of an L-shaped backing member 37 that is mounted on the disc 10.

The member 37 is positioned to be engaged by the rear wall 38 of the scoop 11 and the scoop, which is also provided with end walls 39 and 40 is provided with a reversible scraper blade 41 that is secured to the other edge with bolts 42. The rear wall 38 of the scoop is provided with an upper flange 43 to which a connecting rod 44 of a piston 45 in a cylinder 46 is connected with a pin 47. The lower end of the cylinder is mounted on the flange 36 and the flange is secured to the disc 10. The cylinder 46 is provided with fluid pressure supply connections 48 and 49 whereby fluid under pressure may be supplied to either end of the cylinder. With the parts, as illustrated in Figure 5, the fluid under pressure supplied to the connection 49 drives the piston 45 upwardly whereby the back or inner end of the scoop is elevated about the hinge formed with the rod 12 and the scoop is moved from the position shown in Figure 5 to that shown in broken lines in Figure 1.

The member 38, at the back of the scoop, is also provided with hubs 50 and 51 in which a pin 52 on the end of a connecting rod 53 may be, selectively, positioned, whereby with the connecting rod 53 extended from the cylinder 54 and with the cylinder pivotally mounted by cradle 55 on the platform 13 pressure may be applied to the ends of the cylinder through the connections 56 and 57 to rotate the scoop about the axis of the stud 14.

The cylinder 54 is pivotally mounted by trunnions 58 in upwardly extended arms of the cradle, and the cradle is pivotally mounted on the platform 13 with a stud 59. The stud 59 is adapted to pivotally mount the cradle, with a cylinder therein in an opening 60 at one side of the platform 13, as shown by dotted lines, or in an opening 61 at the opposite side of the platform. With the cylinder pivotally mounted in the opening 61 the pin 52 is positioned in the hub 51 of the member 37 at the back of the scoop. The rod 15 with which the platform 13 is pivotally mounted in the ends 16 and 17 of the telescoping sections of the lower beams of the A frames extends through flanges 62 of a bracket 63 that is secured to the lower surface of the platform 13 by welding or other suitable means.

The telescoping sections 18 and 19 are tied together with a cross rod 64 and these sections extend into tubular members or cylinders 20 and 21 with pistons 65 on the inner ends adapted to be moved outwardly with fluid under pressure supplied to connections 66, or inwardly with fluid under pressure supplied through connections 67 at the outer ends of the cylinders.

It will be understood that although these connecting rods and cylinders are illustrated as being circular they may also be formed of other suitable shapes and, as illustrated in Figure 10, telescoping sections 68, similar to the sections 18 and 19, may be actuated in tubes or base members 69 with fluid pressure cylinders or jacks 70 and connecting rods 71. In this design the cylinders 70 are mounted on the members 69 or are connected thereto by suitable means and connecting rods 71 are connected to collars 72 on the members 68 with pins 73. The hydraulic jacks or pressure cylinders of this type may also be used in different parts of the frame such as on the horizontal beams or cylinders of the triangular shaped frames, the modified form being shown in detail in Figure 10.

The A frames, of which the cylinders 20 and 21 form lower base members are provided with hubs 73 which form bearings and the bearings are provided with caps 74 that are secured in position with bolts 75. It will be understood that these bearings or hubs may be designed to be pivotally mounted on rear axle housings of tractors or on axles or shafts of other vehicles.

The rod 28 with which the platform 13 is pivotally mounted in the ends of the telescoping sections 26 and 27 of the triangular shaped frames extends through a hub 80 of the rear edge of the platform and the parts are secured in assembled relation with washers 81 positioned on the rod and between the telescoping sections and ends of the hubs, and the washers are held by nuts 82 which are threaded on the ends of the rod. The telescoping sections 26 and 27 are similar to corresponding telescopic sections 18 and 19 of the A frames and the sections 26 and 27 are provided with pistons 83 in the cylindrical sections 24 and 25 whereby with fluid under pressure supplied through connections 84 the telescoping sections with the platform, are driven outwardly. Also with fluid under pressure supplied to the connections 85 the pistons and telescoping sections are drawn inwardly.

The triangular shaped sections are also provided with bearings 86 and 87 and the bearings are provided with caps 88 and 89, respectively.

In the design illustrated in Figures 7, 8 and 9 a bucket having a base 90 with side walls 91 is positioned in L-shaped frame members 92 in the side walls of which triangular shaped slots 93 are provided and connecting rods 94 of fluid pressure cylinders 95 are connected to studs 96 which extend through the slots 93, whereby upon contracting the cylinders by supplying fluid under pressure to connections 97 the bucket or scoop may be moved from the position shown in full lines in Figure 7 to that shown in broken lines. The cylinders are provided with return connections 98 at the opposite ends, and openings 99 are provided at the opposite ends of the L-shaped members for connecting the cylinders to the opposite ends of the members.

The studs 96 are welded in the walls of the scoop or bucket and, as shown in Figure 9 the studs are positioned in bushings 100 in which they are secured with nuts 101 whereby the studs may extend through the slots to provide free sliding travel or movement thereof. The studs 96 extend through eyes 102 on the ends of the connecting rods 94 and the eyes are secured on the studs with nuts 103 and washers 104.

The operating parts of the attachment may be connected to the power take off or other operating elements and, as illustrated in Figure 1, the A frames 22 and 23 are provided with eyes 105 to which rods 106, as indicated by the broken lines, may be attached. The rods 106 are adapted to be actuated by the hydraulic or pneumatic cylinders or jacks, or by other suitable means.

The triangular-shaped frames 24 and 25 are provided with straight eyes 107 and rods, as indicated by the broken lines 108 may be attached to these eyes. The opposite ends of the rods 108 may be connected to suitable means for operating the frame.

Although the attachment is illustrated as having a scoop or bucket mounted on the rise or turn table of the platform it will be understood that other implements or devices, such as a bull rake head or the like may be positioned on the platform.

Figure 2:
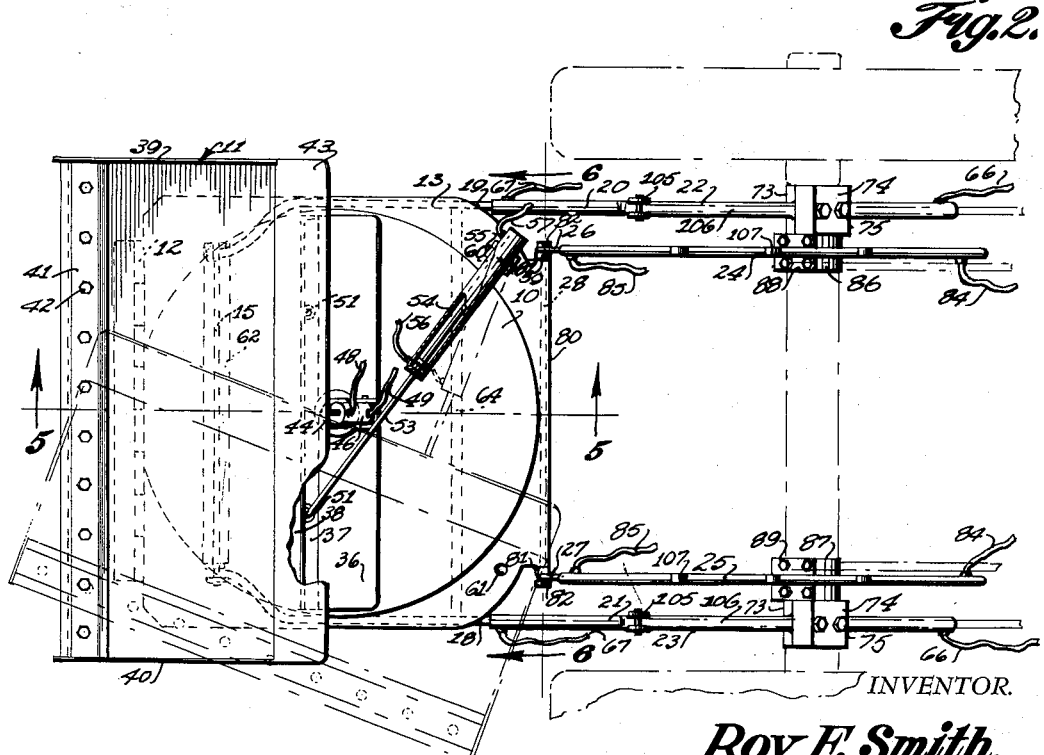
Figure 2 is a plan view of the attachment also with parts of the fluid pressure cylinders broken away.

It will also be understood that the platform may be used for other purposes as with the A frames and triangular shaped frames actuated by an operator on a tractor, truck or the like upon which the attachment is mounted the platform may be moved upwardly and retained in a horizontal position continuously whereby a painter or other workman positioned on the platform may be raised and lowered as desired or may be supported in an elevated position with the platform, as illustrated in Figure 2. The bucket or scoop may be removed and the platform used for elevating packages so that the device is adapted for storing and loading materials in bulk or in packages, or as may be desired.

It will be understood that other modifications, within the scope of the appended claim, may be made in the design and arrangement of the parts without departing from the spirit of the invention.

What is claimed is:

In an attachment for tractors and other vehicles, the combination which comprises spaced vertically disposed frames having fluid pressure actuated telescoping elements in base members thereof, a platform, means pivotally connecting pairs of the frames to the platform at longitudinally spaced points, a turn table journaled on the platform, a hydraulic jack positioned to actuate the turn table, a scoop pivotally mounted on the turn table, and a hydraulic jack for actuating the scoop to a dumping position, and means for pivoting the frames to raise and lower the same.

References Cited in the file of this patent

UNITED STATES PATENTS

| | | |
|---|---|---|
| 2,468,201 | Hoover | Apr. 26, 1949 |
| 2,622,749 | Stuhr | Dec. 23, 1952 |
| 2,646,182 | Maas | July 21, 1953 |

OTHER REFERENCES

Wagner Publication Form No. 1093, 2 pages. (Copy in Div. 4.)